United States Patent
Münning et al.

(10) Patent No.: US 12,454,265 B2
(45) Date of Patent: Oct. 28, 2025

(54) METHOD FOR OPERATING A DRIVER ASSISTANCE SYSTEM OF A VEHICLE, AND VEHICLE

(71) Applicant: Volkswagen Aktiengesellschaft, Wolfsburg (DE)

(72) Inventors: Daniel Münning, Braunschweig (DE); Michael Rohlfs, Rötgesbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 79 days.

(21) Appl. No.: 18/566,706

(22) PCT Filed: May 20, 2022

(86) PCT No.: PCT/EP2022/063753
§ 371 (c)(1),
(2) Date: Dec. 4, 2023

(87) PCT Pub. No.: WO2022/253595
PCT Pub. Date: Dec. 8, 2022

(65) Prior Publication Data
US 2024/0270243 A1    Aug. 15, 2024

(30) Foreign Application Priority Data
Jun. 4, 2021    (DE) .................. 10 2021 205 669.5

(51) Int. Cl.
*B60W 30/12*    (2020.01)
*G01C 21/34*    (2006.01)
*G06V 20/56*    (2022.01)

(52) U.S. Cl.
CPC ......... *B60W 30/12* (2013.01); *G01C 21/3407* (2013.01); *B60W 2420/403* (2013.01);
(Continued)

(58) Field of Classification Search
None
See application file for complete search history.

(56) References Cited

U.S. PATENT DOCUMENTS 7,292,920 B2 *    11/2007    Maass ................. G05D 1/0246
180/170
7,809,506 B2 *    10/2010    Kuge .................... B62D 6/007
701/301
(Continued)

FOREIGN PATENT DOCUMENTS

DE    102006038018 A1 *    2/2008    .......... B60W 40/076
DE    102006040334 A1 *    3/2008    ............ B60W 30/12
(Continued)

OTHER PUBLICATIONS

German Office Action, Application No. 102021205669.5, 5 pages, Nov. 23, 2021.
(Continued)

Primary Examiner — Kevin R Steckbauer
(74) Attorney, Agent, or Firm — Slayden Grubert Beard PLLC (57) ABSTRACT

The disclosure relates to a method for operating a driver assistance system of a vehicle. The driver assistance system is designed to effect lateral guidance of the vehicle. For lateral guidance, the driver assistance system uses data which are provided to the driver assistance system by a vehicle-external memory apparatus. Support points are selected from the map data, which are changed by means of a computing apparatus of the vehicle into a data format usable for lateral guidance, and are then used by the driver assistance system for lateral guidance. The support points to be changed into the data format and can be used for lateral guidance are selected depending on a driving situation of the vehicle. Furthermore, the disclosure relates to a corresponding vehicle.

20 Claims, 3 Drawing Sheets

(52) U.S. Cl.
CPC ..... *B60W 2520/10* (2013.01); *B60W 2552/05* (2020.02); *B60W 2556/40* (2020.02); *B60W 2710/20* (2013.01); *B60W 2720/24* (2013.01); *G06V 20/588* (2022.01)

(56) References Cited

U.S. PATENT DOCUMENTS

| | | | | |
|---|---|---|---|---|
| 7,821,421 | B2 * | 10/2010 | Tamir | H01L 23/49838 340/901 |
| 8,258,980 | B2 * | 9/2012 | Becker | G08G 1/167 382/104 |
| 9,381,852 | B2 * | 7/2016 | Foltin | G06V 20/584 |
| 9,619,203 | B2 * | 4/2017 | Tamir | G07C 5/008 |
| 10,210,772 | B2 * | 2/2019 | Tamir | G06Q 30/0283 |
| 10,304,333 | B2 * | 5/2019 | Engel | H04W 4/029 |
| 10,489,650 | B2 * | 11/2019 | Puttagunta | G05B 15/02 |
| 10,611,366 | B2 * | 4/2020 | Jundt | B60T 8/17554 |
| 10,814,872 | B2 | 10/2020 | Sofra et al. | |
| 10,816,993 | B1 * | 10/2020 | Tran | G05D 1/0246 |
| 10,928,830 | B1 * | 2/2021 | Tran | B60W 30/12 |
| 11,226,622 | B2 * | 1/2022 | Körner | G01C 21/32 |
| 11,307,040 | B2 * | 4/2022 | Tohriyama | G01C 21/3848 |
| 11,345,371 | B2 * | 5/2022 | Spehr | G01C 21/3461 |
| 11,355,031 | B2 * | 6/2022 | Tamir | G08G 1/096775 |
| 11,762,616 | B2 * | 9/2023 | Seitz | B60K 35/22 345/589 |
| 11,796,325 | B2 * | 10/2023 | Malson | G01S 19/06 |
| 12,205,470 | B2 * | 1/2025 | Pang | G08G 1/0145 |
| 12,227,179 | B2 * | 2/2025 | Oguro | B60W 40/06 |
| 2004/0249535 | A1 * | 12/2004 | Maass | B62D 15/029 701/72 |
| 2006/0145827 | A1 * | 7/2006 | Kuge | B60K 31/0008 340/439 |
| 2007/0027583 | A1 * | 2/2007 | Tamir | H01L 23/49838 701/1 |
| 2009/0167560 | A1 * | 7/2009 | Becker | B60W 40/072 348/149 |
| 2012/0232733 | A1 * | 9/2012 | Herbin | B60W 40/076 701/22 |
| 2014/0163848 | A1 * | 6/2014 | Tamir | G08G 1/164 701/117 |
| 2014/0219506 | A1 * | 8/2014 | Foltin | B60Q 1/143 382/104 |
| 2017/0123434 | A1 | 5/2017 | Urano et al. | 701/25 |
| 2017/0221381 | A1 * | 8/2017 | Tamir | G06F 7/00 |
| 2018/0186210 | A1 | 7/2018 | Noll et al. | |
| 2018/0304884 | A1 * | 10/2018 | Jundt | B60W 10/18 |
| 2018/0322782 | A1 * | 11/2018 | Engel | G08G 1/163 |
| 2019/0180646 | A1 * | 6/2019 | Tamir | G08G 1/096716 |
| 2019/0196472 | A1 * | 6/2019 | Körner | B60W 60/0016 |
| 2019/0377352 | A1 * | 12/2019 | Weißwange | B60W 60/0027 |
| 2020/0164871 | A1 * | 5/2020 | Bauer | B60W 30/18163 |
| 2020/0225044 | A1 * | 7/2020 | Tohriyama | G01C 21/3848 |
| 2020/0353951 | A1 * | 11/2020 | Spehr | B60W 60/0025 |
| 2021/0108926 | A1 * | 4/2021 | Tran | G06T 17/05 |
| 2021/0157330 | A1 * | 5/2021 | Tran | G06V 10/82 |
| 2021/0180979 | A1 * | 6/2021 | Kitahara | G08G 1/096758 |
| 2021/0199463 | A1 * | 7/2021 | Kitahara | G01C 21/3815 |
| 2022/0302000 | A1 * | 9/2022 | Tamir | H01L 23/49838 |
| 2022/0406178 | A1 * | 12/2022 | Ran | G08G 1/0112 |
| 2023/0123418 | A1 * | 4/2023 | Kolbe | B60W 60/001 701/25 |
| 2023/0174060 | A1 * | 6/2023 | Oguro | G06V 20/588 |
| 2023/0258458 | A1 * | 8/2023 | Malson | G01C 21/32 701/533 |
| 2023/0373487 | A1 * | 11/2023 | Adiprasito | B60W 30/18072 |
| 2023/0373506 | A1 * | 11/2023 | Adiprasito | B60W 30/18136 |
| 2023/0373517 | A1 * | 11/2023 | Adiprasito | B60W 30/14 |
| 2023/0382373 | A1 * | 11/2023 | Adiprasito | B60W 60/005 |
| 2023/0382386 | A1 * | 11/2023 | Adiprasito | B60W 30/18027 |
| 2023/0382435 | A1 * | 11/2023 | Dingfelder | B60W 60/0018 |
| 2023/0391331 | A1 * | 12/2023 | Adiprasito | G06V 20/58 |
| 2023/0406313 | A1 * | 12/2023 | Adiprasito | B60W 30/18154 |
| 2023/0406314 | A1 * | 12/2023 | Adiprasito | B60W 60/001 |
| 2024/0199010 | A1 * | 6/2024 | Shimizu | B60W 30/12 |
| 2024/0270243 | A1 * | 8/2024 | Münning | G01C 21/3407 |
| 2024/0409122 | A1 * | 12/2024 | Engelhorn | B60W 50/00 |
| 2024/0416942 | A1 * | 12/2024 | Resch | B60W 50/0097 |
| 2025/0091573 | A1 * | 3/2025 | Stark | B60W 30/12 |
| 2025/0130068 | A1 * | 4/2025 | Kim | G01C 21/3859 |

FOREIGN PATENT DOCUMENTS

| | | | | |
|---|---|---|---|---|
| DE | 102011006570 | A1 * | 10/2012 | B60Q 1/143 |
| DE | 102015013143 | A1 * | 4/2017 | B60T 8/17554 |
| DE | 102017009435 | A1 * | 4/2019 | G06T 7/20 |
| DE | 102021205669 | B3 * | 9/2022 | G01C 21/3407 |
| DE | 102023124799 | B3 * | 12/2024 | B60W 30/12 |
| EP | 3350050 | B1 | 2/2019 | B60W 30/10 |
| EP | 3444568 | A1 | 2/2019 | G01C 21/30 |
| EP | 3310595 | B1 | 3/2019 | B60G 17/0165 |
| WO | WO-2020191712 | A1 * | 10/2020 | B60W 40/072 |
| WO | WO-2022253595 | A1 * | 12/2022 | G01C 21/3407 |

OTHER PUBLICATIONS

International Search Report and Written Opinion, Application No. PCT/EP2022/063753, 16 pages, Aug. 26, 2022.

* cited by examiner

METHOD FOR OPERATING A DRIVER ASSISTANCE SYSTEM OF A VEHICLE, AND VEHICLE

CROSS-REFERENCE TO RELATED APPLICATIONS

This application claims priority to German Patent Application No. DE 10 2021 205 669.5, filed on Jun. 4, 2021 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a method for operating a driver assistance system of a vehicle. The driver assistance system is designed to effect lateral guidance of the vehicle. For lateral guidance, the driver assistance system uses data which are provided to the driver assistance system by a vehicle-external memory apparatus. Furthermore, the disclosure relates to a vehicle.

A driver assistance system designed for the lateral guidance of a vehicle can be based on the fact that roadway markings are recognized by means of an environment sensor such as a vehicle camera, whereby control during lateral guidance is based on the recognition of these roadway markings. Such lateral guidance on the basis of roadway markings recognized by means of the camera can be significantly improved when additional map data are used that were created based on swarm data and provided to the driver assistance system.

The map data created based on swarm data namely contains a large number of highly current and also highly precise pieces of information, in particular on the environment of the vehicle that possesses the driver assistance system. When these map data are to be used by the driver assistance system, strong limitations must be observed, however. This holds true in particular with respect to saving the map data in a memory of the driver assistance system, and in respect to preparing the data in order to be able to use it for lateral guidance. Accordingly, not all of the information contained in the map data can be used in the driver assistance system. This needs to be taken into consideration when using the map data for lateral guidance.

SUMMARY

A need exists to provide a method for operating a driver assistance system which is improved with respect to an utilization of resources of the vehicle, and to provide a vehicle configured to carry out such a method. The need is addressed by the subject matter of the independent claim(s). Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the driver assistance system is designed to effect lateral guidance of the vehicle. For lateral guidance, the driver assistance system uses data which are, or respectively were provided to the driver assistance system by a vehicle-external memory apparatus. Support points are selected from the map data that are changed by means of a computing apparatus of the vehicle into a data format which can be used for lateral guidance. Then the support points are used by the driver assistance system for lateral guidance. The support points to be changed into the data format that are usable for lateral guidance are selected depending on a driving situation of the vehicle.

By taking into account the specific driving situation of the vehicle when selecting the support points to be changed into the data format which can be used for lateral guidance, or respectively to be transformed or converted, it is possible to ensure that they are adapted to the particular driving situation in a particularly suitable manner when selecting the support points. As a result, it can be ensured that precisely those support points are used for lateral guidance that can be used very beneficially for lateral guidance in light of the driving situation of the vehicle. Consequently, the computing apparatus also needs to expend computing power only for these support points in order to change, or respectively transform, or convert the support points into the data format usable for lateral guidance. Consequently, the method is improved in terms of the use of the resources of the vehicle, in particular in the form of the computing power of the computing apparatus. This is because the computing power is used in a very situation-specific and therefore targeted manner since the driving situation of the vehicle is taken into account when the computing power is used.

Furthermore, the fact can be taken into account that the size of a memory of a driver assistance system into which the map data can be introduced is usually rather severely restricted or limited. Since however only the support points selected depending on the driving situation of the vehicle are used for lateral guidance in the present case, the memory available in the driver assistance system is used, or respectively employed in a very favorable manner. In particular, memory-optimized use of the map data which are for example created based on swarm data can thereby be achieved. Consequently, the method can in particular achieve a memory-optimized use of swarm data.

When changing the support points into the data format that can be used for lateral guidance, in particular the support points can be converted in such a way that they are subsequently present in a coordinate system of the vehicle. Then the transformed support points, or respectively those changed into the usable data format in the coordinate system of the vehicle can be used very precisely and situationally appropriate for lateral guidance.

The map data for example generated or created based on swarm data can in particular contain information that is provided by a vehicle fleet in the form of a plurality of third-party vehicles. For example, the third-party vehicles belonging to the vehicle fleet can record sensor data during their respective trips, in particular in the form of image data, for example by means of respective surroundings sensors of the respective third-party vehicle, in particular in the form of at least one camera of the respective third-party vehicle. The swarm data uploaded to the vehicle-external storage device, for example in the form of a server, or respectively a cloud, can comprise a plurality of content which is then also contained in the map data created on the basis of the swarm data. In particular, such map data can be provided to the driver assistance system by the vehicle-external storage device for lateral guidance.

In particular, if these map data contain linear elements such as roadway markings, and/or at least one roadway edge, and/or built structures such as curbs, and/or respective roadways or trajectories of the third-party vehicles, the map data created on the basis of the swarm data can be used in a particularly beneficial manner for lateral guidance by the driver assistance system of the vehicle. To limit the amount of map data obtained from the vehicle-external storage device and/or data uploaded from the third-party vehicles to the vehicle-external storage device, a protocol can be used for the respective data transfer between the vehicle-external storage device and the vehicle, or respectively between the third-party vehicle and the vehicle-external storage device (and vice versa in each case) in which the data are transmitted in compressed form. This contributes to an improvement of the method with regard to the utilization of resources of the vehicle.

The data that are obtained from the vehicle-external storage device, in particular map data, can be unpacked in the vehicle having the driver assistance system. The content consisting of the map data which can be used for lateral guidance can then be provided to the driver assistance system, which can then control a steering apparatus of the vehicle for the purpose of lateral guidance.

Since, however, the size of the memory used by the driver assistance system is limited, not all the map data, or respectively swarm data can be provided to an algorithm effecting the lateral guidance of the vehicle which is run by the driver assistance system. This is taken into account in the present case by selecting the support points, wherein taking into account the driving situation of the vehicle when selecting the support points to be changed into the usable data format improves the utilization of resources of the vehicle and in particular of the driver assistance system.

In some embodiments, a road type on which the vehicle is located is taken into account in a determination of the driving situation. This is based on the knowledge that different support points can be used depending on the road type and therefore a respective type of street currently being used by the vehicle. This is because the map data which are available for the respective road type can also be different in detail and/or contain different elements. By taking this into account in the selection of the support points, lateral guidance particularly well adapted to the respective road type can be achieved by the driver assistance system.

For example, if the vehicle is on a type of street in the form of a multi-lane roadway with a plurality of roadway markings, other support points can be used than if, for example, the type of street is a side street with sparse or no roadway markings at all. By taking this into account when determining the driving situation, a particularly targeted selection of the support points can be achieved.

In addition or alternatively and in some embodiments, a speed of the vehicle can be taken into account when determining the driving situation. This is based on the awareness that it makes sense in each case to select different support points from the map data depending on the driving speed of the vehicle. This is because the selection of support points from the map data are associated with the extent of the projection that the surroundings lying in front of the vehicle in the driving direction can be taken into account during lateral guidance. At a low driving speed of the vehicle, a shorter projection is accordingly sufficient in comparison to a higher driving speed of the vehicle. Taking this into account in the selection of the support points ensures improved lateral guidance. Furthermore, this allows in particular a driver of the vehicle to be warned early on, for example in the event of a critical or difficult point with regard to lateral guidance, which is in front of the vehicle in the driving direction.

In some embodiments, a plurality of groups of support points are used for lateral guidance. In this case, the support points assigned to a respective group are arranged along a respective linear element which is contained in the map data. In particular support points arranged along lines, i.e., chains of points or point chains can be used in particular very well for lateral guidance. Moreover, linear elements such as roadway markings, and/or a roadway edge, and/or trajectories of third-party vehicles, or respectively driven paths of third-party vehicles are already frequently present in map data which are created based on swarm data. Consequently, the use of support points along such linear elements can be technically implemented very easy. Moreover, a lateral guide in the form of a central guide, in which at least one linear element is arranged on both sides of the vehicle, can therefore be easily implemented.

Furthermore, it is beneficial for improved lateral guidance if a plurality of groups of support points are used which are each arranged along linear elements. This is because if a plurality of such groups of support points are used for lateral guidance, particularly reliable lateral guidance can be realized by the driver assistance system.

In some embodiments, a plurality of groups of the support points used for lateral guidance is set depending on the driving situation, wherein the respective group is assigned to one of the linear elements. Then, if a larger number of groups is used in the driving situation than in another driving situation, a number of support points to be used per respective group is for example reduced.

If, for example, it is usually provided to use five groups of support points which correspondingly belong to five respective linear elements, six groups of support points, for example, can be used in a certain driving situation which belong to six respective linear elements. In this particular driving situation, the number of support points to be used per respective group, or respectively in the respective group can then be reduced, for example to five-sixths of the normally used support points per group. In this way, it can be prevented that an excessive number of support points has to be changed into the data format that can be used for lateral guidance.

Consequently, it can be provided that the number of overall support points used per point in time for lateral guidance does not increase at all or at least very little, even though more groups of support points are used than usual in the given driving situation. This is beneficial in terms of the computing power that can be provided by the computing apparatus.

In some embodiments, the map data include linear elements in the form of respective trajectories which are created based on routes of third-party vehicles. In this case, at least two groups of support points are selected from the map data, and the respective group is assigned to one of the trajectories. A trajectory created based on routes of a plurality of third-party vehicles can also be called a swarm data path. In that a plurality of such trajectories, or respectively such swarm data paths are used for lateral guidance, particularly precise and reliable lateral guidance of the vehicle by means of the driver assistance system is achievable.

The linear elements or trajectories do not need to be straight in this case; instead, a lane change to another lane and/or to a departure, or respectively exit can be indicated or reproduced by the respective trajectory. A use of such non-linear trajectories is also beneficial for reliable lateral guidance of the vehicle by means of the driver assistance system.

In some embodiments, when the vehicle in the driving situation is on a roadway having a plurality of marked lanes, support points of at least two trajectories are used for lateral guidance. In this case, the respective trajectory is assigned a driving direction which corresponds to a driving direction of the vehicle on the roadway. Accordingly, trajectories or swarm data paths oriented in the same direction are for example used for lateral guidance when driving on the roadway having the plurality of lanes. Since such trajectories are usually contained in the map data for the multi-lane roadway, the use of these trajectories for lateral guidance is particularly easy to accomplish and expedient.

Furthermore, a use of linear elements such as in the form of at least one roadway edge can be dispensed with without this making lateral guidance difficult. This is based on the awareness that on the roadway having a plurality of marked lanes, there are already a sufficient number of linear elements, in particular in the form of roadway markings of the respective lanes. These roadway markings are on the one hand clearly visible and on the other hand very accurate, in particular in comparison to a linear element in the form of the roadway edge. Therefore, the use of at least two trajectories facing the same driving direction during a journey of the vehicle on the roadway having the plurality of marked lanes is particularly beneficial.

Whether the vehicle is located on the roadway having a plurality of marked lanes can be determined in particular by using information from a navigation system of the vehicle. This is technically very easy to implement and reliable.

In particular, in a driving situation in which the vehicle is located on a highway or similar expressway or the like having a plurality of marked lanes, the use of at least two trajectories, or respectively swarm data paths pointing in the driving direction of the vehicle is beneficial. This holds true in particular if at least one of these trajectories is used instead of a roadway edge of the highway for lateral guidance.

In some embodiments, when the vehicle is in the driving situation on a country road, support points of two trajectories are used for lateral guidance which are assigned to opposite directions of travel. Of these opposite directions of travel, one corresponds to the driving direction of the vehicle located on the country road. This is based on the awareness that, in particular on a country road that is usually narrower than a multilane roadway, the use of the trajectory that describes a typical route of oncoming vehicles is helpful for lateral guidance. In this way, it can be ensured in particular that the vehicle is sufficiently far away from the trajectory of oncoming traffic in the transverse direction of the country road during the lateral guidance effected by the driver assistance system. This is conducive to increased driving safety, or respectively road safety.

Moreover, the use of the trajectory describing the route of the oncoming traffic in addition to the trajectory that points in the driving direction of the vehicle having the driver assistance system is beneficial in cases in which there are none or is only one poorly recognizable central roadway marking on the road. Such a central roadway marking, to the extent that it exists, separates a lane provided for oncoming traffic from the lane on which the vehicle having the driver assistance system is driving. Especially in such a driving situation, or respectively in a such a case in which such a center line is not present on the country road or is not recognizable, the trajectory of the oncoming traffic can be used very beneficial for lateral guidance.

However, even when such a center line exists, the use of the trajectory of oncoming traffic in addition to the linear element in the form of the center line can facilitate or improve lateral guidance by the driver assistance system.

In some embodiments, the number of support points to be changed into the data format and assigned to one of the linear elements is set depending on the speed of the vehicle. In particular, the number of support points can be reduced given a comparatively lower driving speed of the vehicle in order to relieve the computing apparatus. Furthermore, a shorter projection is also sufficient given a comparatively low driving speed of the vehicle than at a higher driving speed of the vehicle. Since a less far-reaching projection can already be realized with a smaller number of support points, the setting of the number of support points depending on the driving speed of the vehicle is also helpful in this respect.

Additionally or alternatively, an average distance between the support points to be changed into the data format can be set along the respective linear element depending on a driving speed of the vehicle. This is based on the awareness that a correspondingly far-reaching projection is usable given a high driving speed of the vehicle. This comparatively far-reaching projection can be realized in particular in that a greater average distance between the support points is selected than is the case at the lower driving speed of the vehicle.

In contrast, given a lower driving speed of the vehicle, a smaller average distance between the support points along the respective linear element can be provided. This is helpful with regard to the precision of lateral guidance.

In some embodiments, the driver assistance system uses at least one image taken by a camera of the vehicle for lateral guidance in addition to the support points. For example, such images can be taken by a front camera of the vehicle, wherein the front camera can, for example, detect roadway markings and can use the detected roadway markings for lateral guidance. This is beneficial with regard to improved lateral guidance.

In some embodiments, at least one of the support points used by the driver assistance system for lateral guidance is located in an area that is outside the detection range of the camera. This is based on the awareness that the detection range of the camera is naturally limited in the driving direction of the vehicle. If support points which are located outside, in particular in front of a front end of the detection area in the driving direction of the vehicle, are then used by the driver assistance system for lateral guidance, particularly far projecting lateral guidance can be realized.

The use of support points located outside the detection range of the camera is however also beneficial with regard to the fact that support points located behind a curve or the like, for example, can accordingly be used for lateral guidance, which would not be detectable by means of the camera even if the camera had a longer detection range in the driving direction of the vehicle. This is therefore also beneficial with regard to particularly far projecting lateral guidance of the vehicle, which can be realized by the driver assistance system.

In particular, a memory for saving the map data and therefore also the support points to be transformed can be integrated into the camera of the vehicle. Moreover, the driver assistance system can also be provided by the camera. In such an embodiment, the memory available in the camera adapted to the driving situation of the vehicle can be used since in particular a memory-optimum use of the map data or swarm data is enabled by the memory of the camera.

Moreover, the computing unit of the vehicle can be integrated in the camera of the vehicle. In this way, the driver assistance system is provided by the camera, and another control unit of the vehicle does not have to be accessed for lateral guidance. Instead, directly corresponding steering commands can be output by the camera to a steering apparatus of the vehicle, wherein said steering commands effect the lateral guidance of the vehicle.

A vehicle according to some embodiments has a driver assistance system which is designed to effect lateral guidance of the vehicle and to use map data for lateral guidance. The map data can be transmitted to the driver assistance system by a vehicle-external memory apparatus. The driver assistance system is designed to select support points from the map data, which are changeable by means of a computing apparatus of the vehicle into a data format usable for the lateral guidance and can then be used by the driver assistance system for lateral guidance. The driver assistance system is moreover designed to select the support points to be changed into the data format that can be used for lateral guidance depending on a driving situation of the vehicle. Consequently, the vehicle is designed to carry out the method according to the teachings herein and is therefore improved in terms of the utilization of vehicle resources.

In particular, rules can be implemented in the driver assistance system for selecting the support points depending on the driving situation, for example by drawing on or utilizing at least one characteristic map.

Also belonging to the invention are embodiments of the vehicle that have features which have already been described in conjunction with the embodiments of the method. For this reason, the corresponding embodiments of the vehicle are not described again here.

The invention also includes combinations of the features of the described embodiments.

In the following, further embodiments of the invention are described.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

Figure 1:
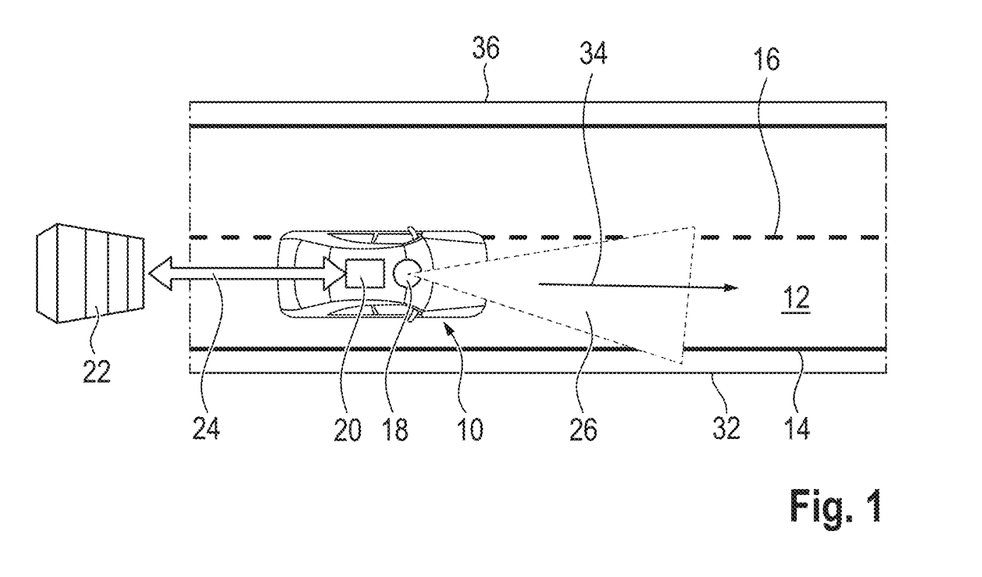
FIG. 1 schematically shows an example driving situation in which a vehicle with a driver assistance system supportively uses swarm data, or respectively map data for lateral guidance of the vehicle, wherein the lateral guidance of the vehicle is carried out in particular on the basis of roadway markings which are recorded by a camera of the vehicle.

FIG. 1 shows a highly schematized driving situation in which a vehicle 10 drives along a lane 12 of a street which is bordered on both sides by roadway markings 14, 16. In the situation shown by way of example in FIG. 1, the roadway marking 14 on the right in the driving direction of the vehicle 10 is a solid line, and the roadway marking 16 on the left relative to the driving direction of the vehicle 10 is a dashed, or respectively interrupted line. These roadway markings 14, 16 or lanes are detected by means of a camera 18 of the vehicle 10, which is designed as a front camera in the present case, and the detected image data are used for lateral guidance of the vehicle 10.

Accordingly, steering movements or respectively steering angles of steerable wheels of the vehicle 10 are realized by using a driver assistance system 20 of the vehicle 10. The driver assistance system 20, which is only shown schematically in FIG. 1, can in particular be integrated into the camera 18. FIG. 1 schematically shows a detection area 26 of the camera 18 in which the roadway markings 14, 16 are located in the present case.

Furthermore, in addition or alternatively to the exemplary camera 18 shown in the present case, the vehicle 10 can have more surroundings sensors such as at least one radar device and/or at least one ultrasonic sensor or the like.

In the present case, the vehicle 10 and in particular the driver assistance system 20 is also designed to receive map data from a vehicle-external storage device such as a server 22 or a cloud which may in particular be created based on swarm data.

For this purpose, the swarm data can be uploaded from third-party vehicles (not shown) of a correspondingly equipped vehicle fleet to the server 22 which then provides the map data. The vehicle 10 shown in FIG. 1 can also upload swarm data to the server 22, for example in the form of images detected by the camera 18. A data transfer between the server 22 and the vehicle 10 is illustrated in FIG. 1 by a double arrow 24.

Figure 2:
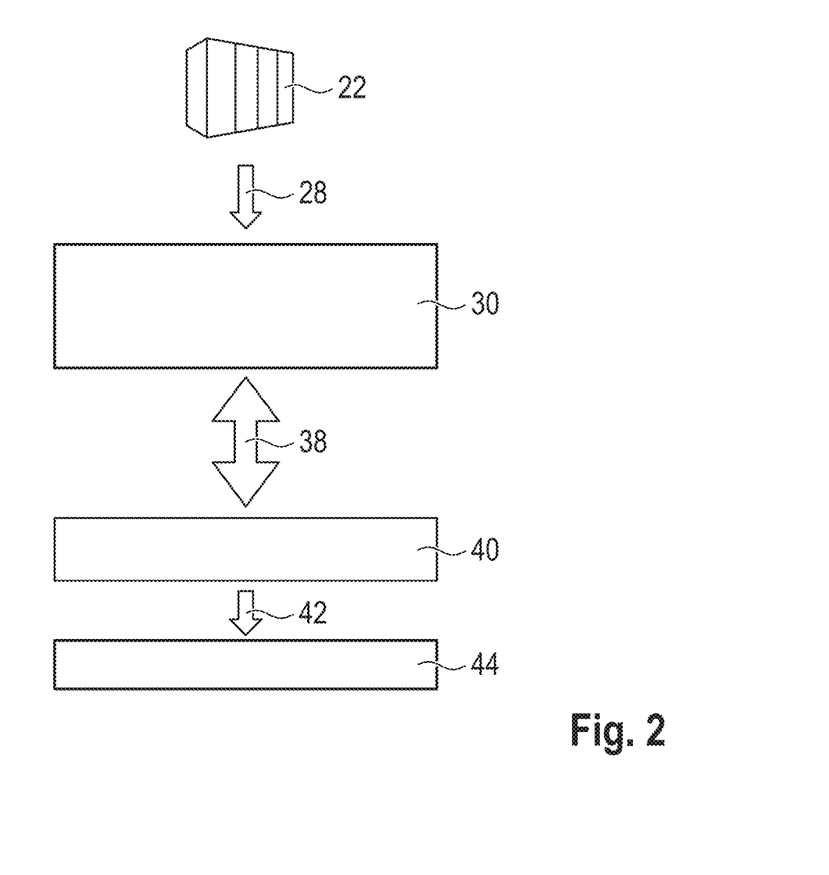
FIG. 2 shows an example flow chart illustrating the supportive use of the map data for lateral guidance.

Another data transfer 28 of map data usable for lateral guidance of the vehicle 10 from the server 22 to the vehicle 10 and in particular to the driver assistance system 20 of the vehicle 10 is illustrated in FIG. 2 by another arrow. In the vehicle 10, after this data transfer 28, a calculation of point chains is made for each point in time to be considered in the lateral guidance of the vehicle 10. A corresponding calculation block 30 is also schematically shown in FIG. 2.

The calculation of the point chains occurring in the calculation block 30 is performed in the present case by a computing apparatus of the vehicle 10 which can be a component of the driver assistance system 20 and in particular the camera 18. In the calculation of the point chains, the support points or points contained in the map data are converted into a coordinate system of the vehicle 10. In this way, the points or support points are changed into a data format usable for lateral guidance so that these support points can then be used by the driver assistance system 20 for lateral guidance.

It can be provided that, independent of the driving situation, point chains predefined in advance can be used with respective support points for lateral guidance. For example, five specified point chains from the map data can be used for lateral guidance, wherein each point chain can have a respective number of support points, or points per point in time. For example, 40 points per point chain can be used as fixed support points at a respective point in time. Given five previously defined point chains, 200 calculations result per point in time in the form of the conversion of the respective support points into the coordinate system of the vehicle 10. If these calculations of the support points of the point chains are carried out every 20 milliseconds, this results in 1,000 calculations per second. Accordingly, the computing apparatus converts or transfers a comparatively large number of reference points per time unit or point in time into the coordinate system of the vehicle, or respectively changes them into the data format usable for lateral guidance.

It can be provided that the five predefined point chains along which the respective support points are calculated, or respectively converted into the data format usable for lateral guidance, are specified linear elements. These linear elements are contained in the map data which is provided to the calculation block 30 during the data transfer 28 according to FIG. 2.

With regard to the driving situation schematically shown in FIG. 1, the specified linear elements can comprise a right-hand roadway edge 32 in the driving direction and a right-hand roadway marking in the driving direction of the vehicle 10, for example in the form of the roadway marking 14. At the roadway edge 32, the roadway comprising the lane 12 borders for example an unpaved terrain, for example in the form of a grass strip. A corresponding transition from, in particular, grassy terrain to, for example, asphalt of the roadway is also referred to as a road edge.

The linear elements contained in the map data and usable for lateral guidance can moreover include a drivable path, or respectively a trajectory 34 which is shown schematically in FIG. 1. The trajectory 34 created based on routes of third-party vehicles can also be called a swarm data path. Furthermore, a left-hand roadway marking in the driving direction of the vehicle 10 in the form of the roadway marking 16 and a left-hand roadway edge 36 or left-hand road edge can be used for lateral guidance of the vehicle 10 in a predefined use of five point chains or linear elements.

If support points along precisely these five predefined linear elements, or respectively precisely these five predefined point chains in the form of the two roadway edges 32, 36, the two roadway markings 14, 16 and the trajectory 34, or respectively the swarm data path are used for lateral guidance of the vehicle 10, the lateral guidance is not very flexible. In particular, it then cannot be taken into account whether more usable or other, or respectively additional linear elements are present in the map data.

In the present case, the point chains, or respectively the linear elements contained in the map data are therefore variable, and the point chains are selected depending on the respective driving situation of the vehicle 10. Accordingly, the support points contained in the respective point chains or linear elements, which are changed into the data format usable for lateral guidance in the calculation block 30, are also selected depending on the driving situation of the vehicle 10.

This variable selection of the point chains or linear elements and hence also the support points is illustrated in FIG. 2 by another double arrow 38. After their transformation, or respectively transference into the data format usable for lateral guidance, the support points selected depending on the driving situation and accordingly optimally adapted to the respective driving situation are forwarded to an algorithm 40 which is schematically shown in FIG. 2 and implemented in the driver assistance system 20.

Accordingly, the algorithm 40 is executed by the driver assistance system 20 which in particular can be integrated into the camera 18 of the vehicle 10. The lateral guidance of the vehicle 10 can accordingly be carried out in particular by the camera 18 designed as a front camera. During lateral guidance, the driver assistance system 20, or respectively the camera 18 issues corresponding steering commands 42 (see FIG. 2) to a steering apparatus 44 of the vehicle 10, which is not shown separately in FIG. 1 but is shown schematically in FIG. 2.

Examples of a selection of the linear elements and the associated support points adapted to the respective driving situation of the vehicle 10 will be explained with reference to FIG. 3 to FIG. 5.

Figure 3:
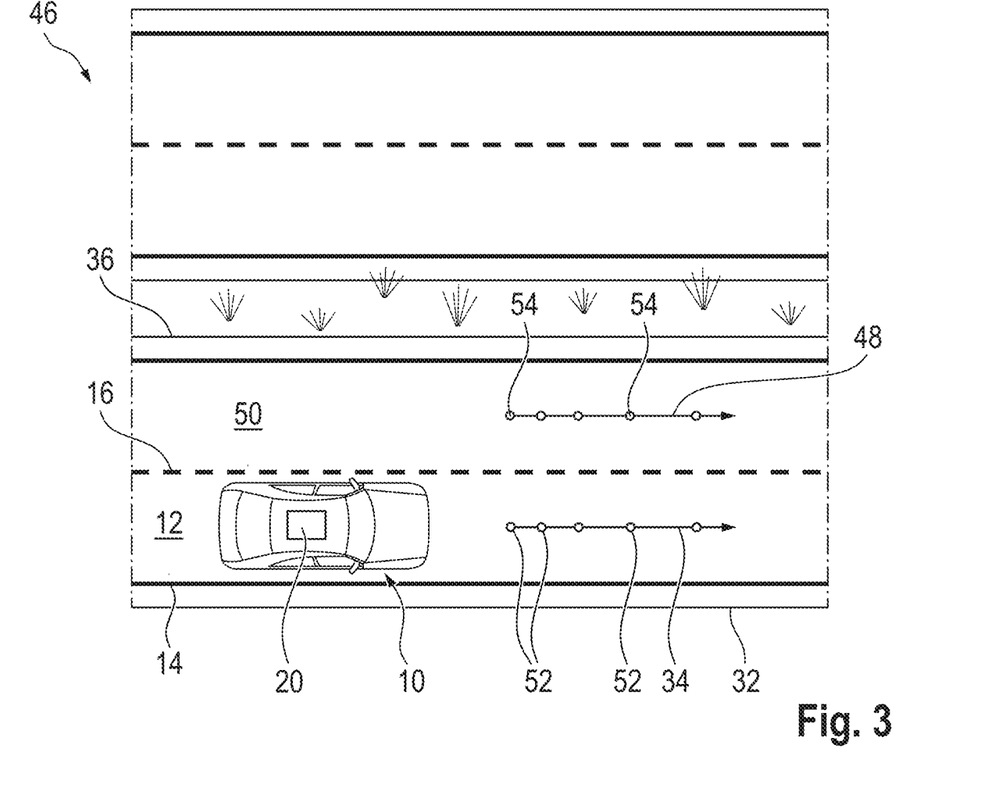
FIG. 3 schematically shows an example driving situation in which the vehicle according to FIG. 1 is on a highway.

FIG. 3 schematically shows a driving situation in which the vehicle 10 is located on a roadway having a plurality of marked lanes, for example in the form of a highway 46. In this driving situation, for example, the roadway edges 32, 36 are not required for lateral guidance because other linear elements can be better used for lateral guidance by the driver assistance system 20 of the vehicle 10 due to the plurality of roadway markings present on the highway 46. However, the linear element is still used in the form of the swarm data path, or respectively trajectory 34 which was created based on the route of the third-party vehicles of the vehicle fleet.

In addition to this drivable path, or respectively trajectory 34, a linear element in the form of another trajectory 48 is used which is also schematically shown in FIG. 3. This additional trajectory 48 is located, for example, on a lane 50 of the highway 46 which is adjacent to the lane 12 on which the vehicle 10 is driving and is separated from this lane 12 by the roadway marking 16. In this case, the same driving directions are assigned to the respective trajectories 34, 48. Accordingly, the trajectories 34, 48 point in the same direction.

In FIG. 3, a first group of support points 52 which are assigned to the first trajectory 34 are shown by way of example and schematically. For reasons of clarity, not all of these support points 52 that are assigned to the first trajectory 34 are provided with a reference sign in FIG. 3. Furthermore, the number of these support points 52 shown in FIG. 3 is also merely schematic and is not to be viewed as corresponding to reality. In addition, FIG. 3 also does not show the support points which are assigned to the linear elements, for example in the form of the roadway markings 14, 16, which are also used by the driver assistance system 20 in the context of lateral guidance on the highway 46.

From the schematic representation in FIG. 3, it can nonetheless be discerned that in greater proximity to the vehicle 10, the number of support points 52 per unit of length can be larger than at a greater distance from the vehicle 10. In particular, the distances between the support points 52 can increase as the distance from the vehicle 10 increases. This also holds true analogously to the support points of the other linear elements used for lateral guidance on the highway 46, wherein these support points are not shown separately in FIG. 3 for reasons of clarity.

However, FIG. 3 shows that respective support points 54 also belong to the second trajectory 48, for which the statements about the support points 52 of the first trajectory 34 apply analogously. If the highway 46 has more than the two lanes 12, 50 per driving direction shown in the present case by way of example, another trajectory (not shown) can also be used for lateral guidance. This holds true in particular when the trajectories oriented in the driving direction, of which the first trajectory 34 and the second trajectory 48 are shown by way of example in FIG. 3, are used for lateral guidance instead of the roadway edges 32, 36.

For lateral guidance on the highway 46, for example the roadway markings 14, 16 of the lane 12 on which the vehicle 10 is driving are still used. In addition, a roadway marking of the second lane 50 on the left in the driving direction can be used for the lateral guidance of the vehicle 10.

Figure 4:
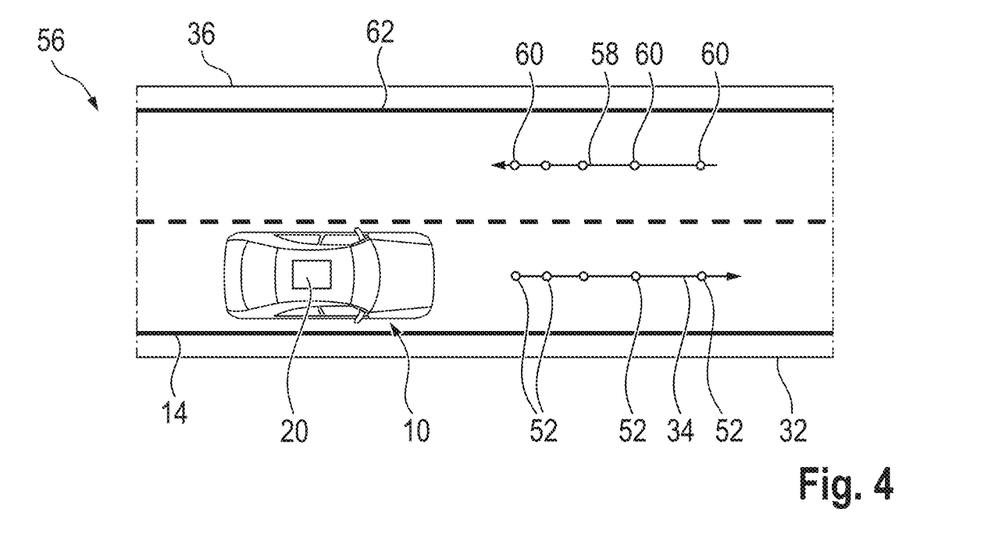
FIG. 4 schematically shows another example driving situation in which the vehicle according to FIG. 1 is located on a country road.

In FIG. 4 in contrast, a driving situation is schematically shown in which the vehicle 10 which has the driver assistance system 20 is driving on a country road 56. In this driving situation, for example the right-hand roadway edge 32 in the driving direction of the vehicle 10 and the roadway marking 14 in the form of the solid line are again used for lateral guidance in addition to the trajectory 34 with the associated support points 52.

With the driving situation on the country road 56 shown in FIG. 4, the case may however occur that there is no center line which separates a lane for oncoming traffic from the lane on which the vehicle 10 is moving in the driving direction that is indicated by the first trajectory 34. To improve lateral guidance in this situation, another trajectory 58 can be used which is schematically shown in FIG. 4 and is created based on the routes of third-party vehicles which are associated with the oncoming traffic relative to the vehicle 10. This trajectory 58 of oncoming traffic to which the respective support points 60 are belong, can be used for lateral guidance instead of the center line that is not present on the country road 56.

When driving along the country road 56, it is moreover beneficial to also use the second roadway edge 36 as a linear element contained in the map data for the lateral guidance of the vehicle 10 by means of the driver assistance system 20. This left-hand roadway edge 36 in the driving direction of the vehicle 10 lies opposite the first roadway edge 32 according to FIG. 4 in the transverse direction of the country road 56.

If, in addition, another roadway marking 62 is used for the lateral guidance on the country road 56 which, in the present case, is adjacent to the roadway edge 36 and is formed as a solid line, then instead of five point chains or five linear elements, in this case six chains of points, or respectively six linear elements are used for lateral guidance. To nonetheless restrict the computing work of the computing apparatus in the calculation block 30 (see FIG. 2), the number of support points can be reduced for each linear element taken into account for lateral guidance.

For example, the respective number of support points per linear element can be reduced to five-sixths of the number of support points per linear element that would be used if just five point chains were used. If 40 support points 52, 54, 60 are usually used per linear element, or respectively per point chain, then after a reduction by the factor per point chain, or respectively per linear element cited by way of example, only a number of, for example, 33 support points 52, 54, 60 can be supplied to the calculation block 30 (see FIG. 2). This is then associated with a reduced projection in the lateral guidance of the vehicle 10 by means of the driver assistance system 20. However, the memory and the computing apparatus of the driver assistance system 20 are spared.

Figure 5:
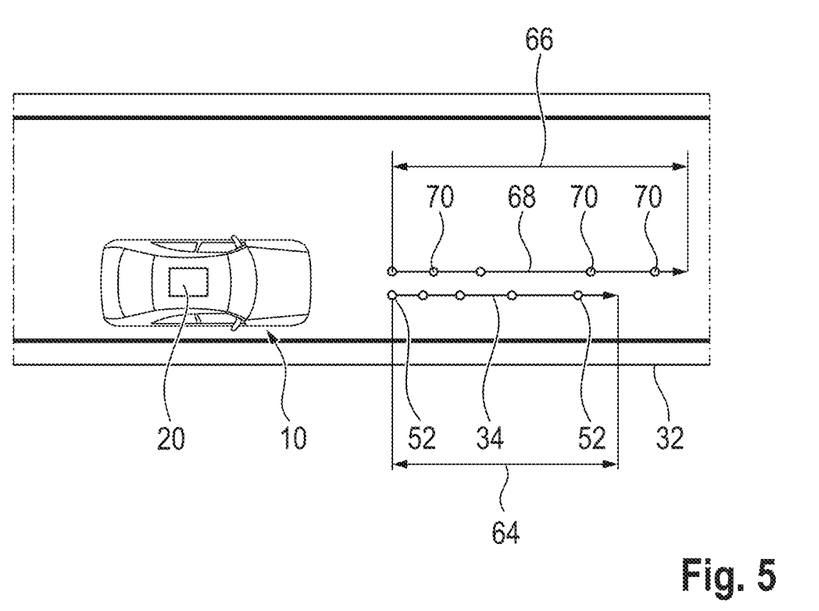
FIG. 5 schematically shows respective example driving situations in which lateral guidance with different extents of projection is performed by the vehicle according to FIG. 1.

With reference to FIG. 5, another example will be explained of the extent to which the driving situation of the vehicle 10 can be taken into account in the selection of the point chains, or respectively the linear elements and therefore also the support points. For example, a first point chain in the form of the trajectory 34 with the associated support points 52 is schematically shown in FIG. 5. The other linear elements used for lateral guidance of the vehicle 10 by means of the driver assistance system 20 are not shown in greater detail in FIG. 5 for reasons of clarity.

However, by means of the first trajectory 34 in FIG. 5, a case is illustrated in which the vehicle 10 is moving at a comparatively low driving speed. This is the case, for example, when the vehicle 10 is traveling in an urban area, or respectively in a city. Corresponding to the comparatively low driving speed of the vehicle 10, in such a case, a shorter length 64 of the point chain, for example in the form of the trajectory 34, is sufficient for lateral guidance than would be the case given a higher driving speed by the vehicle 10 on the roadway or street schematically shown in FIG. 5.

If the vehicle 10 is driving on this roadway or street at a higher speed, accordingly point chains or linear elements of greater length 66 can be used for lateral guidance. As an example of such a point chain with a greater length 66, FIG. 5 shows another trajectory 68 which was also created based on routes of third-party vehicles. That which is stated above and below in the comparison of the first trajectory 34 with the other trajectory 68 also applies analogously to other linear elements which can be used for lateral guidance of the vehicle 10 by means of the driver assistance system 20.

According to FIG. 5, the second trajectory 68 used for the higher driving speed of the vehicle 10 has a greater length 66 in comparison to the length 64 of the first trajectory 34. This is because when the vehicle 10 is driving faster, or respectively when the vehicle 10 is driving at a higher speed, which can occur, for example, on the highway 46 (see FIG. 3), a long projection makes sense.

As an example of viewing the lateral guidance of the vehicle 10 having the higher driving speed, FIG. 5 also schematically shows support points 70 associated with the longer trajectory 68. In particular from a comparison of the support points 52, which are assigned to the first trajectory 34 shown in FIG. 5, with the support points 70 which are assigned to the other trajectory 68 shown in FIG. 5, it can be recognized the extent to which the driving speed of the vehicle 10 can be taken into account with regard to the driving situation.

Accordingly, fewer support points 52 belong to the first trajectory 34 than the support points 70 belonging to the trajectory 68. Correspondingly, the number of support points 52, 70 assigned to the respective linear element is set depending on the driving speed of the vehicle 10. In addition, the support points 70 of the second trajectory 68 are on average a greater distance from each other than the support points 52 of the first trajectory 34. This is also beneficial with regard to a long projection at the higher driving speed of the vehicle 10.

In contrast, for example, at the low driving speed of the vehicle 10, for example 40 support points along the trajectory 34 do not necessarily have to be taken into account, which can be associated with a projection of approximately 200 meters. Instead, at the slow driving speed of the vehicle 10, fewer support points 52 or points along the point chain in the form of the first trajectory 34 in FIG. 5 are sufficient with regard to projecting lateral guidance.

In particular, lower and upper limit values can be provided for the length of the point chains, or respectively linear elements, such as the trajectory 34, 68 shown by way of example in FIG. 5. In this regard, it is helpful when the linear elements used for lateral guidance of the vehicle 10 allow a projection up to a distance in the driving direction in front of the vehicle 10 which is covered in approximately two seconds to three seconds at the respective driving speed of the vehicle 10.

Overall, the examples show how a method for the memory-optimized use of swarm data, or respectively map data can be realized in the camera 18 of the vehicle 10, which, for example, is designed as a front camera.

LIST OF REFERENCE NUMERALS

10 Vehicle
12 Lane
14 Lane marking
16 Lane marking
18 Camera
20 Driver assistance system
22 Server
24 Double arrow
26 Detection area
28 Data transfer
30 Calculation block
32 Roadway edge
34 Trajectory
36 Roadway edge
38 Double arrow
40 Algorithm
42 Steering command
44 Steering direction
46 Highway
48 Trajectory
50 Lane
52 Support point
54 Support point
56 Country road
58 Trajectory
60 Support point
62 Lane marking
64 Length
66 Length
68 Trajectory
70 Support point The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a driver assistance system of a vehicle, wherein the driver assistance system is configured to effect a lateral guidance of the vehicle, wherein the driver assistance system uses map data for lateral guidance, the method comprising:
providing the map data to the driver assistance system from a memory, which memory is external to the vehicle;
selectively selecting a number of support points from the map data, which number is selected as a function of a driving situation of the vehicle;
converting, by a computer of the vehicle, the support points into converted support points having a data format, suitable for lateral guidance; and
using the converted support points by the driver assistance system for lateral guidance of the vehicle.

2. The method of claim 1, comprising determining a driving situation; wherein, when determining the driving situation, one or more of a road type on which the vehicle is located and a driving speed of the vehicle is taken into account.

3. The method of claim 1, wherein a plurality of groups of support points are used for lateral guidance, wherein the support points belonging to a respective group are arranged along a respective linear element which is contained in the map data.

4. The method of claim 3, wherein a number of groups of the support points to be used for lateral guidance is set depending on the driving situation; wherein a respective group is assigned to one linear element, wherein if a larger number of groups is used in the driving situation than in another driving situation, a number of support points to be used per respective group is reduced.

5. The method of claim 1, wherein the map data comprises linear elements in the form of respective trajectories which are created based on routes of third-party vehicles, wherein at least two groups of support points are selected from the map data, and the respective group is assigned to one of the trajectories.

6. The method of claim 5, wherein, when the vehicle in the driving situation is on a roadway, having a plurality of marked lanes, support points of at least two trajectories are used for lateral guidance, wherein a driving direction is assigned to the respective trajectory which corresponds to a driving direction of the vehicle on the roadway.

7. The method of claim 5, wherein, if the vehicle in the driving situation is located on a country road, support points of two trajectories are used for lateral guidance and are assigned opposite driving directions, of which one corresponds to the driving direction of the vehicle located on the country road.

8. The method of claim 3, wherein a number of support points to be changed into the data format and assigned to one of the linear elements and/or an average distance between the support points to be changed into the data format along the respective linear element is set depending on a driving speed of the vehicle.

9. The method of claim 1, wherein, for lateral guidance, the driver assistance system uses, beyond the support points, at least one image taken by a camera of the vehicle, wherein at least one of the support points used by the driver assistance system for lateral guidance is located in an area which lies outside a detection range of the camera.

10. A vehicle with a driver assistance system which is configured to effect a lateral guidance of the vehicle and to use map data for lateral guidance, which can be transmitted to the driver assistance system from a storage apparatus external to the vehicle; wherein the driver assistance system is configured to selectively select number of support points from the map data which are changeable using a computer of the vehicle into a data format usable for lateral guidance and can be subsequently used by the driver assistance system for lateral guidance, wherein the driver assistance system is configured to select the number of support points to be changed into the data format usable for lateral guidance in dependence of a driving situation of the vehicle.

11. The method of claim 2, wherein a plurality of groups of support points are used for lateral guidance, wherein the support points belonging to a respective group are arranged along a respective linear element which is contained in the map data.

12. The method of claim 11, wherein a number of groups of the support points to be used for lateral guidance is set depending on the driving situation; wherein a respective group is assigned to one linear element, wherein if a larger number of groups is used in the driving situation than in another driving situation, a number of support points to be used per respective group is reduced.

13. The method of claim 2, wherein the map data comprises linear elements in the form of respective trajectories which are created based on routes of third-party vehicles, wherein at least two groups of support points are selected from the map data, and the respective group is assigned to one of the trajectories.

14. The method of claim 3, wherein the map data comprises linear elements in the form of respective trajectories which are created based on routes of third-party vehicles, wherein at least two groups of support points are selected from the map data, and the respective group is assigned to one of the trajectories.

15. The method of claim 4, wherein the map data comprises linear elements in the form of respective trajectories which are created based on routes of third-party vehicles, wherein at least two groups of support points are selected from the map data, and the respective group is assigned to one of the trajectories.

16. The method of claim 13, wherein, when the vehicle in the driving situation is on a roadway, having a plurality of marked lanes, support points of at least two trajectories are used for lateral guidance, wherein a driving direction is assigned to the respective trajectory which corresponds to a driving direction of the vehicle on the roadway.

17. The method of claim 14, wherein, when the vehicle in the driving situation is on a roadway, having a plurality of marked lanes, support points of at least two trajectories are used for lateral guidance, wherein a driving direction is assigned to the respective trajectory which corresponds to a driving direction of the vehicle on the roadway.

18. The method of claim 15, wherein, when the vehicle in the driving situation is on a roadway, having a plurality of marked lanes, support points of at least two trajectories are used for lateral guidance, wherein a driving direction is assigned to the respective trajectory which corresponds to a driving direction of the vehicle on the roadway.

19. The method of claim 6, wherein, if the vehicle in the driving situation is located on a country road, support points of two trajectories are used for lateral guidance and are assigned opposite driving directions, of which one corresponds to the driving direction of the vehicle located on the country road.

20. The method of claim 4, wherein a number of support points to be changed into the data format and assigned to one of the linear elements and/or an average distance between the support points to be changed into the data format along the respective linear element is set depending on a driving speed of the vehicle.

* * * * *